United States Patent [19]

Sasaki et al.

[11] Patent Number: 4,748,319
[45] Date of Patent: May 31, 1988

[54] BAR CODE SCANNER

[75] Inventors: Hiroaki Sasaki; Koji Nakase, both of Furukawa, Japan

[73] Assignee: Alps Electric Co., Ltd., Japan

[21] Appl. No.: 915,750

[22] Filed: Oct. 6, 1986

[30] Foreign Application Priority Data

Oct. 8, 1985 [JP] Japan .................. 60-153106[U]

[51] Int. Cl.⁴ .............................................. G06K 7/10
[52] U.S. Cl. ................................................... 235/472
[58] Field of Search ........................................ 235/472

[56] References Cited

U.S. PATENT DOCUMENTS 4,460,120 7/1984 Shephard ............................. 235/472

Primary Examiner—Harold I. Pitts
Attorney, Agent, or Firm—Guy W. Shoup

[57] ABSTRACT

A bar code scanner has a light-emitting element, a light-receiving element, an optical means for applying a light beam from the light-emitting element to a bar code area and for leading the light reflected from the bar code area to the light-receiving element, an electrical processing circuit, a sensor body for accommodating the light-emitting element, the light-receiving element and the optical means, a pair of split casing members for retaining the sensor body, an intermediate cap for connecting together the pair of split casing members, and a distal end cap adapted to be detachably retained by the intermediate cap in such a manner that a light incident and emergent portion of the sensor body alone is exposed. The bar code scanner is provided with a projection formed on an extending portion provided at one end of each of the split casing members and adapted to contact the side portion of the sensor body with flexibility so that the sensor body is movable. A retaining portion is formed on the inner surface of the intermediate cap, and an engaging portion is formed on the outer surface of each of the split casing members and adapted to engage with the retaining portion, whereby the retaining portion and the engaging portion are fitted to each other in such a manner that the extending portion deflects about the projection.

3 Claims, 2 Drawing Sheets

BAR CODE SCANNER

BACKGROUND OF THE INVENTION

1. Field of the Invention

The present invention relates to a bar code scanner which optically reads a bar code.

2. Description of the Related Art

One type of bar code scanner has heretofore been known which has a light-emitting element, a light-receiving element, an optical means adapted to apply a light beam from the light-emitting element to a bar code area and to lead the light reflected from the bar code area to the light-receiving element, and an electrical processing circuit.

In this type of bar code scanner, an extremely important factor in determining the resolution of its optical system is a mechanism for retaining the distal end portion of the sensor at which a lens which is a constituent element of the optical means is exposed to the outside. One example of the retaining mechanism will be explained below with reference to FIG. 3 which is a fragmentary sectional view thereof.

In FIG. 3, the reference numeral 1 denotes a sensor body which supports a light-emitting element, a light-receiving element and an optical means, (not shown), together with a lens 2 and the like. A split casing 3 which consists of a pair of upper and lower split casing members houses the sensor body 1 in such a manner that a clearance X is defined therebetween so as to allow the sensor body 1 to move along the longitudinal axis thereof, that is, in the horizontal direction as viewed in FIG. 3, and the distal end of the sensor body 1 projects from one end of the casing 3. An intermediate cap 4 is adapted for joining the respective ends of the upper and lower casing members of the split casing 3 and thereby connecting them together. The cap 4 has a retaining projection 6 formed on the inner periphery thereof which is fitted into an engaging recess 5 formed in the outer periphery of each of the portions 3a which extend from the distal end of the split casing 3. A distal end cap 7 has a through-hole 7a for exposing a light incident and emergent portion of the sensor body 1, that is, the lens 2, to the outside. The distal end cap 7 is detachably threaded to the intermediate cap 4.

In the above-described conventional device, the distance l between the front face of the lens 2 and the open end of the through-hole 7a must be set with a high degree of accuracy since it is an important factor in determining the resolution of the optical system of the sensor body 1. However, cumulation of possible dimensional errors in relation to the split casing 3, the intermediate cap 4 and the distal end cap 7 may hinder the distance l from being set with the required dimensional accuracy at all times. For this reason, the sensor body 1 is adapted to be movable relative to the split casing 3 along the longitudinal axis, that is, in the horizontal direction as viewed in FIG. 3, thereby allowing dimensional adjustment.

The above-described conventional device, however, needs to provide the clearance X between the sensor body 1 and the inner periphery of the split casing 3 in order to allow the longitudinal movement of the sensor body 1, and this clearance X also leads to the following disadvantage. When the retaining portion 6 of the intermediate cap 4 is fitted into the engaging portion 5 formed on each extending portion 3a of the split casing 3, the clearance X allows the portion 3a to be pressed excessively and thereby bent inwardly, and the deformation of the portion 3a may continue while leaving the fitting between the engaging portion 5 and the retaining portion 6 in an incomplete state.

SUMMARY OF THE INVENTION

In view of the above-described circumstances, it is an object of the present invention to provide a bar code scanner which is so designed that the split casing and the intermediate cap are reliably fitted to each other and the sensor body is still movable, thereby overcoming the above-described disadvantage of the prior art.

To this end, the present invention provides, in a bar code scanner having a light-emitting element, a light-receiving element, an optical means for applying a light beam from the light-emitting element to a bar code area and for leading the light reflected from the bar code area to the light-receiving element, an electrical processing circuit, a sensor body for accommodating the light-emitting element, the light-receiving element and the optical means, a pair of split casing members for retaining the sensor body, an intermediate cap for connecting together the pair of split casing members, and a distal end cap adapted to be detachably retained by the intermediate cap in such a manner that a light incident and emergent portion of the sensor body alone is exposed, the improvement which comprises: a projection formed on an extending portion provided at one end of each of the split casing members and adapted to contact the side portion of the sensor body with flexibility so that the sensor body is movable; a retaining portion formed on the inner surface of the intermediate cap; and an engaging portion formed on the outer surface of each of the split casing members and adapted to engage with the retaining portion, whereby the retaining portion and the engaging portion are fitted to each other in such a manner that the extending portion deflects about the projection.

BRIEF DESCRIPTION OF THE DRAWINGS

FIGS. 1(a), 1(b) and 2 show in combination one embodiment of the present invention, in which:

FIG. 1(a) is an exploded perspective view of the embodiment;

FIG. 1(b) is an exploded perspective view of the sensor body; and

FIG. 2 is a fragmentary sectional view of an essential part of the embodiment.

DESCRIPTION OF THE PREFERRED EMBODIMENT

One embodiment of the present invention will be described hereinunder with reference to FIGS. 1(a), 1(b) and 2.

Figure 1A:
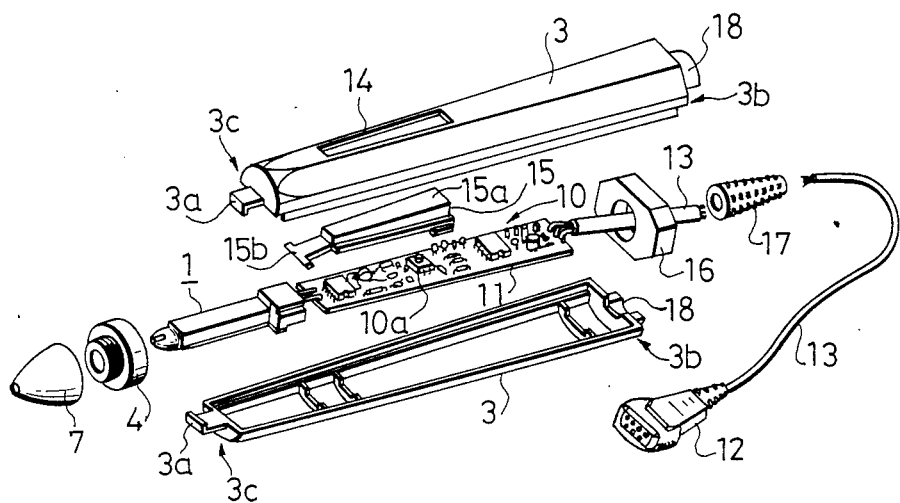
Figure 1B:
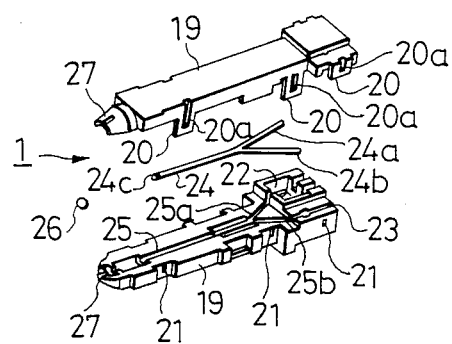
Figure 2:
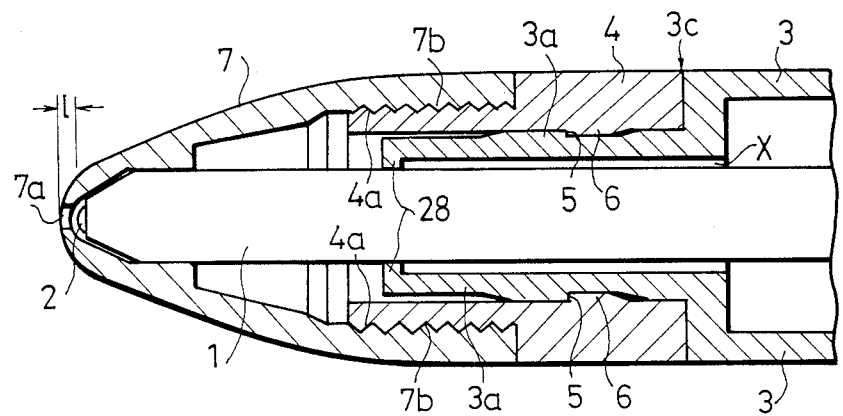
Figure 3:
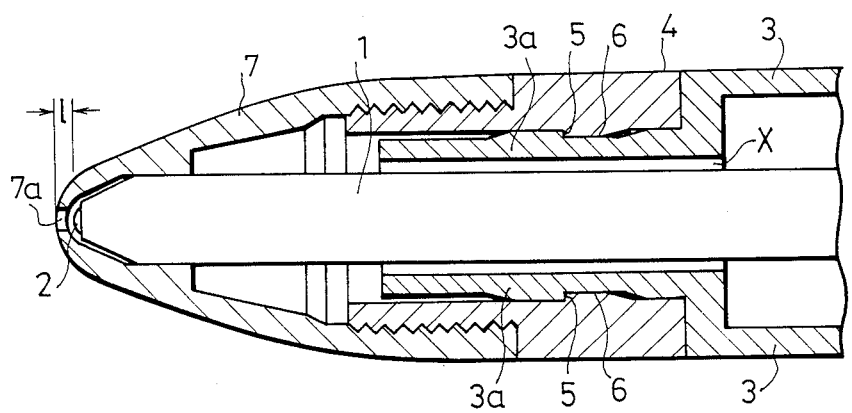
FIG. 3 is a fragmentary sectional view of a prior art.

FIG. 1(a) is an exploded perspective view of a bar code scanner; FIG. 1(b) is an exploded perspective view of a sensor body; and FIG. 2 is a fragmentary sectional view of an essential part of the bar code scanner. In these figures, the members or portions which correspond to those described in FIG. 3 are denoted by the same reference numerals.

As shown in FIG. 1(a), the sensor body 1 is electrically connected to a printed board 11 having an electrical processing circuit 10 mounted thereon, and the printed board 11 is in turn electrically connected at one end thereof through a shielded wire 13 to a connector 12 which contacts a connecting portion of the main body of an apparatus (not shown). The sensor body 1 and the printed board 11 having the electrical processing circuit 10 mounted thereon ar retained in a casing formed by joining together pair of split casing members 3. A rectangular bore 14 is formed in the upper split casing member 3, and a finger-rest portion 15a of an operating member 15 for operating a switching element 10a in the electrical processing circuit 10 is thereby allowed to project from the bore 14. In addition, the upper split casing member 3 supports a pivotally attached portion 15b of the operating member 15. An extending tubular portion 18 is formed at the right-hand end 3b of each of the split casing members 3, and a connecting cap 16 is fitted on the tubular portions 18 which are joined together, thereby connecting the respective ends 3b of the split casing members 3. Further, a rubber cylindrical member 17 into which the shielded wire 13 is inserted is secured inside the tubular portions 18.

Extending portions 3a are formed at the respective left-hand ends 3c of the split casing members 3 and joined together by means of an intermediate cap 4 as described below.

The sensor body 1 will be explained below with reference to FIG. 1(b) which is an exploded perspective view thereof. An outer casing 19 of this sensor body 1 also consists of a pair of upper and lower split casing members. The upper casing member 19 has a plurality of depending walls 20 each provided with an engaging bore 20a, and the lower casing member 19 has a plurality of retaining projections 21 formed at positions corresponding to the engaging bores 20a. The upper and lower casing members 19 are joined together in one unit by fitting the projections 21 into the bores 20a, respectively. In the right-hand portion on the upper side of the lower casing member 19 are provided, side by side, a first accommodating recess 22 for accommodating a light-emitting element such as an LED (not shown) and a second accommodating recess 23 for accommodating a light-receiving element such as a phototransistor (not shown either). In the central portion on the upper side of the casing member 19 is formed a third accommodating recess 25 for accommodating an optical fiber 24. The recess 25 is branched at the right-hand end into two branches, that is, one branch 25a which guides a first branch 24a of the optical fiber 24 to the first accommodating recess 22, and the other branch 25b which guides a second branch 24b of the optical fiber 24 to the second accommodating recess 23. Resilient portions 27 for retaining a ball lens 26 are formed at the respective left ends of the casing members 19. At this portion, the end 24c of the optical fiber 24 which is opposite to the branched end thereof opposes the inner face of the ball lens 26.

The mechanism for connecting together the respective left ends 3c of the split casing members 3 will be explained below with reference to FIG. 2.

A projection 28 is provided on the inner surface of the extending portion 3a formed at the left end 3c of each split casing member 3, and is brought into contact with the outer side of the sensor body 1. A clearance X is provided between the inner surface portion of the extending portion 3a except for the projection 28 and the outer side of the sensor body 1. In addition, the light incident and emergent portion of the sensor body 1, that is, the lens 2 carrying portion, projects from the projections 28 of the split casing 3.

The pair of split casing members 3 are connected together by the intermediate cap 4 while clamping the sensor body 1 therebetween. More specifically, the casing members 3 are joined together by fitting the retaining projection 6 formed on the inner periphery of the cap 4 into the engaging recess 5 formed in the outer periphery of the extending portion 3a of each of the split casing members 3. In this case, even when the retaining projection 6 of the intermediate cap 4 presses the extending portions 3a as the cap 4 is fitted on the casing members 3, each extending portion 3a can deflect about the projection 28 in the direction of the clearance X between the extending portion 3a and the sensor body 1, so that fitting between the retaining portion 6 and the engaging portion 5 can be smoothly effected without any risk of the extending portions 3a being bent undesirably. Further, after the fitting has been completed, the restoring resilient force of the extending portions 3a allows the fitting to be maintained in a satisfactory state.

Since the sensor body 1 and the extending portion 28 of each of the split casing members 3 are brought into resilient contact with each other, the sensor body 1 can move in the longitudinal direction thereof.

A threaded portion 4a which is formed on the outer periphery of the intermediate cap 4 is detachably threaded to a threaded portion 7b of the distal end cap 7 having the through-hole 7a for exposing the lens 2 carrying portion of the sensor body 1 to the outside.

The distance 1 between the front face of the lens 2 and the open end of the through-hole 7a is adjusted by longitudinally moving the senor body 1 such that the optical system of the sensor body 1 is set so as to provide an optimum resolving power.

When the distal end of the cap 7 has become worn, it can readily be replaced with a new one by unscrewing the cap 7 from the intermediate cap 4.

As has been described above, it is possible, according to the present invention, to provide a bar code scanner in which the split casing and the intermediate cap can reliably be fitted to each other, and the sensor body can still be moved so as to adjust the light incident and emergent portion to an optimum position, thereby allowing a reliable signal reading operation.

What is claimed is:

1. In a bar code scanner having a light-emitting element, a light-receiving element, an optical means for applying a light beam from said light-emitting element to a bar code area and for leading the light reflected from said bar code area to said light-receiving element, an electrical processing circuit, a sensor body for accommodating said light-emitting element, said light-receiving element and said optical means, a pair of split casing members for retaining said sensor body, an intermediate cap for connecting together said pair of split casing members, and a distal end cap adapted to be detachably retained by said intermediate cap in such a manner that a light incident and emergent portion of said sensor body alone is exposed, the improvement which comprises:
a projection formed on an extending portion provided at one end of each of said split casing members and adapted to contact a side portion of said sensor body with flexibility so that said sensor body is movable;
a retaining portion formed on the inner surface of said intermediate cap; and an engaging portion formed on the outer surface of each of said split casing members and adapted to engage with said retaining portion, whereby said retaining portion and said engaging portion are fitted to each other in such a manner that said extending portion deflects about said projection.

2. A bar code scanner according to claim 1, wherein said sensor body has an outer casing composed of a pair of upper and lower split casing members.

3. A bar code scanner according to claim 2, wherein said intermediate cap has a threaded portion formed on the outer periphery thereof for thread engagement with said distal end cap.

* * * * *